Reginald S Dean INVENTOR.

United States Patent Office 2,909,472
Patented Oct. 20, 1959

2,909,472

PROCESS FOR PRODUCING TITANIUM CRYSTALS

Reginald S. Dean, Hyattsville, Md., assignor to Chicago Development Corporation, Riverdale, Md., a corporation of Delaware Application July 25, 1956, Serial No. 600,039

3 Claims. (Cl. 204—64)

This invention relates to the production of highly pure titanium. It has for its object the production of coarse crystals of titanium which are readily separated from adhering salt.

Figure 1:
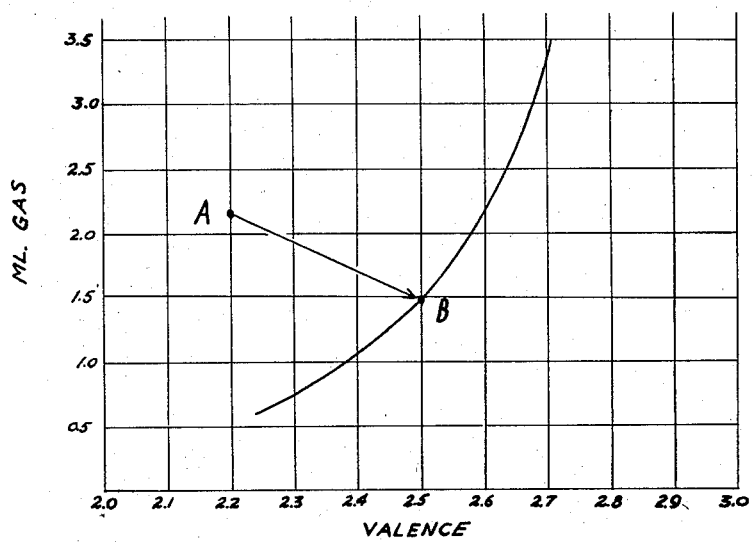
Figure 2:
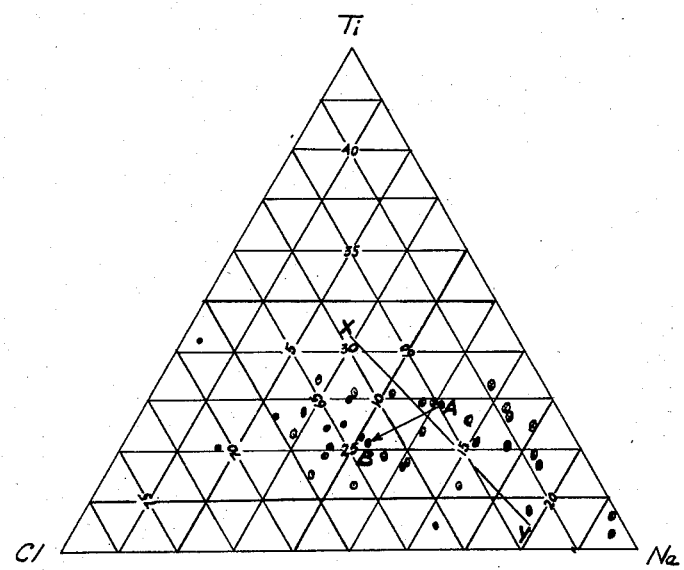

In my co-pending application Serial No. 592,089, filed June 18, 1956, it is disclosed that a single phase field exist in the Na—Ti—Cl system. The relationship of the average valence of the titanium to the gas evolution in ferric sulphate solution for a solution saturated with titanium is shown in Figure 1. These solutions contain about 4.5% Ti at 850° C., the composition range disclosed in my co-pending application includes solutions that are supersaturated with both sodium and titanium. Such solutions may contain up to 8 percent titanium and 2.0 percent sodium. These supersaturated solutions exist within the composition range above the curve in Figure 1. The relationship which exists between the composition ranges for saturated and supersaturated solutions for various contents of soluble titanium is shown in Figure 2. I have chosen a ternary diagram to illustrate this situation because a diagram like Figure 1 is limited to a single concentration of soluble titanium. In this diagram the coordinates are:

(1) Soluble Ti.
(2) Chlorine as percent soluble titanium × average valence to ferric sulphate.
(3) Ml. of $H_2$ evolved per gram in ferric sulphate.

In making the plot these parameters are added and converted to percent of the total. This procedure permits the use of the standard ternary diagram. The dotted line X—Y divides the composition field into saturated and supersaturated areas. For comparison with Figure 1 the compositions A—B are shown. It will be seen that the boundary between saturated and supersaturated is such that at lower titanium contents the valence must be higher and the sodium content higher to bring the composition into the supersaturated range.

I have here described the composition ranges of my invention in terms of system Na—Ti—Cl. It is to be understood that other alkalinous metals may be substituted for sodium in a manner which will be clear from my co-pending application Serial No. 592,089 above referred to.

I have found that such supersaturated solutions will crystallize spontaneously or can be induced to crystallize, for example, by seeding with small titanium crystals, and produce large polyhedral crystals of titanium which may form filamentous bundles. The crystallization of titanium results in the salt immediately surrounding the crystallizing titanium being reduced in dissolved titanium and amount of hydrogen evolved in acidified ferric sulphate solution. In Figure 1 there is shown the composition of the general mass of salt before crystallization at A, and the composition in the interstices of titanium crystals at B, which composition represents the composition in equilibrium with metallic titanium. I have found that the supersaturated solutions from which this crystallization has taken place may be maintained by the simultaneous addition of titanium and sodium.

This simultaneous addition of titanium and sodium may take place, for example, by the addition of mixtures of sodium and titanium chlorides with sodium chloride such as are formed by the low temperature reaction of titanium tetrachloride and sodium. If such mixtures contain sodium and titanium chlorides in the proportion to form titanium and sodium chloride, they may be added to the supersaturated solutions having compositions represented by the area above the curve of Figure 1 at the rate at which metallic titanium crystallizes and thus form the coarse crystals of my invention.

Another method of supplying titanium and sodium to the supersaturated solutions of my invention is by making the solution an electrolyte in a cell having a soluble titanium anode and an inert metallic cathode. This method of making coarse titanium crystals has been disclosed in my co-pending application (with W. W. Gullett), Serial No. 601,705, filed August 2, 1956.

Having now described my invention, which consists in its preferred embodiment in making a supersaturated solution in the system Na—Ti—Cl at 800–850° C., which contains more than 4.5% titanium having an average valence to ferric sulphate of less than 2.3 and gas evolution in ferric sulphate solution in excess of 1.5 ml./gram, initiating crystallization from such supersaturated solution and maintaining such solution by the addition of sodium and titanium chlorides in order to continue the formation of coarse titanium crystals of high purity, I will illustrate it by specific examples.

Since the method of analysis for determining and defining the composition of my invention is new it will be described in detail. Total soluble titanium is determined by dissolving in 1:19 sulphuric acid in an inert atmosphere. When gas evolution has ceased, the titanium is titrated with N/10 dichromate. The titanium in this solution is presumed to be all $Ti^{+++}$. The average valence of the titanium is determined by dissolving in 3 N, ferric sulphate acidified with sulphuric acid and titrating as before with N/10 dichromate. The average valence is then given by:

$$4 - \frac{\text{Ml./dichromate in ferric sulphate}}{\text{Ml./dichromate in sulphuric acid}}$$

Finally hydrogen gas evolution is determined in ferric sulphate solution in a fermentation tube.

Example I

I take a composition in the system Na—Ti—Cl which contains 6.0% soluble titanium which has an average titanium valence of 2.5 to ferric sulphate solution and which has a gas evolution in ferric sulphate of 3.6 ml./gram. I melt this composition and hold it at 850° C. in an argon atmosphere in a cylindrical pot 10 inches diameter. I now add in a centrally located foraminous cylinder 2 inches in diameter the reaction product at 450° C. of 92 grams of sodium and 188 grams $TiCl_4$. I hold the pot at 850° C. and obtain large crystals of titanium more than 1 mm. in average diameter on the outside of the foraminous cylinder. After 8 hours, during which there has been added from the reaction mixture in the foraminous cylinder 350 grams of titanium, I remove the foraminous cylinder and its adhering titanium and allow it to drain at 850° C. and cool in argon. The large crystals of titanium contain 5% of salt which is washed from them with dilute acid. The recovered crystals when melted in argon have a hardness of 80 Brinell.

The tetrachloride used in the reaction mixture contained small percentages of iron and vanadium. These together with a small amount of finely crystalline titanium settle to the bottom of the reaction pot.

The composition of the salt in the reaction pot after removal of the foraminous cylinder is 5.8% soluble titanium having an average valence of 2.5 and a gas evolution of 3.6 ml./gram. The reduction in titanium content is caused by dilution with sodium chloride in the reaction product added. To prevent reduction of the titanium content below 5% of the salt must be removed after each run. The titanium content of this salt thus removed amounts to approximately 20% of that recovered as titanium metal crystals and may be recovered in a number of ways; I prefer to pass chlorine through the molten salt thus producing $TiCl_4$ which is used to produce the low temperature reduction product for the process.

Example II

In this example we use an electrolytic cell like that disclosed in my copending application (with W. W. Gullett) Serial No. 601,705, filed August 2, 1956.

The electrolyte consists of a super-saturated solution containing in molten sodium chloride 5.65% soluble titanium having an everage valence to ferric sulphate of 2.3 and hydrogen evolution in ferric sulphate of 3.2 ml./gram. I place this electrolyte in a cell having a titanium alloy anode as chips in a basket and a steel rod cathode. I pass a direct current to dissolve titanium at the anode and form sodium at the cathode. The sodium formed at the cathode first reduces a thin plate of titanium thereon, then diffusing into the bath forms fine crystals in the titanium depleted cathode area, then further supersaturates the electrolyte and replenishes it in sodium as large titanium crystals form, the supersaturated solution being replenished in titanium by dissolving the anode. The log of this example follows:

| Current During Operation | | Ampere Hours | Volts | |
|---|---|---|---|---|
| Time from Start | Amperes | | Closed Circuit | Open Circuit |
| 1 hour | 20 | 20 | .25 | .04 |
| 2 hours | 30 | 30 | .27 | .05 |
| 3 hours | 40 | 40 | .30 | .05 |
| 4 hours | 50 | 50 | .28 | .00 |
| 5 hours | 50 | 50 | .27 | .00 |
| 6 hours | 60 | 60 | .27 | .00 |
| 7 hours | 70 | 70 | .28 | .00 |
| 8 hours | 80 | 80 | .28 | .00 |
| 9 hours | 80 | 80 | .25 | .00 |
| 9½ hours | 80 | 40 | .25 | .00 |

Anode specifications:
 Composition—
  $O_2$—.144%
  Cr—2.74%
  C—.06%
  Fe—1.34%
  $N_2$—.021%
 Character—Chips, 10 lbs.
 Immersed area—3.0 sq. ft.
 Current density (ave.)—1.82 amps./sq. ft.
 Location—In perforated steel containers 3 inches from cathode in concentric circle
Cathode specifications:
 Composition—Mild steel
 Size—¾" diameter rod
 Immersed area—18.85 sq. in.
 Current density—407 amperes/sq. in.
Electrolyte:
 NaCl+5.05% soluble Ti
 Average valence of Ti to ferric sulphate 2.2
 Hydrogen evolution in ferric sulphate—2.4 ml./gram
Temperature of operation: 850° C.
Deposit:
 Plate—.003 inch thick
 Salt layer—.015 inch thick
 Crystals—1.0 inch thick
 Total weight of deposit—465 grams
 Weight of large crystals—397 grams
 Weight of salt—58 grams
 Weight of fine crystals—10 grams
 Density large crystal deposit—2.2
Analysis:
 Plate—98% Ti, 2% Na
 Fine crystals—99.8% Ti
 Large crystals—99.99% Ti
 Brinell hardness large crystals melted in argon 85

Example III

In this example I make a series of 10 consecutive tests like that in Example II in order to establish that the composition of the electrolyte remains unchanged in the electrorefining, and that coarse crystals of pure titanium may be obtained over a large number of consecutive operations.

The log of these runs is shown in the following table:

| Run No. | Electrolyte Composition | | | Cathode Current Density | g. Ti Per Amp. Hr. | Size of Crystals |
|---|---|---|---|---|---|---|
| | Sol. Ti, Percent | Average Valence | $H^2$ | | | |
| 1 | 4.2 | 2.5 | 2.2 | 200–800 | .75 | 95%+10 mesh. |
| 2 | 4.3 | 2.3 | 1.9 | 200–300 | .80 | ¼" Ave. Dia. |
| 3 | 5.0 | 2.2 | 2.2 | 250–700 | .70 | 95%+10 mesh. |
| 4 | 4.3 | 2.3 | 3.0 | 200–750 | .70 | Do. |
| 5 | 4.4 | 2.2 | 2.4 | 200–750 | .70 | Do. |
| 6 | 4.5 | 2.4 | 2.2 | 200–800 | .70 | 90%+10 mesh. |
| 7 | 4.4 | 2.5 | 2.5 | 200–600 | .75 | 95%+10 Mesh. |
| 8 | 4.3 | 2.7 | 2.7 | 200–750 | .70 | Do. |
| 9 | 4.4 | 2.4 | 2.4 | 200–750 | .70 | Do. |
| 10 | 4.5 | 2.4 | 2.4 | 200–750 | .70 | Do. |

In every case the titanium crystals analyzed more than 99.90% titanium and when melted in argon showed a hardness of less than 100 Brinell. The length of all runs was 500 ampere hours.

What is claimed is:

1. In a process of producing metallic titanium crystals from a single-phase liquid comprising a solution of soluble titanium as chloride in at least one molten alkalinous metal chloride, said liquid when solidified having a capacity to evolve hydrogen in ferric sulphate solution, the production of titanium crystals having an average diameter of more than 1 millimeter by maintaining said single-phase liquid in a composition range having a relationship of (a) total soluble titanium, (b) average titanium valence determined by reduction of ferric sulphate solution and (c) capacity to evolve hydrogen in ferric sulphate solution of: (a) 4.2–6.0% total soluble titanium; (b) an average valence of 2.2–2.7; and (c) hydrogen evolution in ferric sulphate solution of from 1.9 to 3.6 ml. per gram sample and maintaining the single-phase liquid in a molten and super-saturated condition, whilst crystallizing metallic titanium therefrom, by the simultaneous addition thereto of lower chloride of titanium and alkalinous metal at the rate at which titanium crystallizes therefrom.

2. In a process of producing metallic titanium crystals from a single-phase liquid comprising a solution of soluble titanium as chloride in at least one molten alkalinous metal chloride, said liquid when solidified having a capacity to evolve hydrogen in ferric sulphate solution, the production of titanium crystals having an average diameter of more than 1 millimeter by maintaining said single-phase liquid in a composition range having a relationship of (a) total soluble titanium, (b) average titanium valence determined by reduction of ferric sulphate solution and (c) capacity to evolve hydrogen in ferric sulphate solution of: (a) 4.2–6.0% total soluble titanium; (b) an average valence of 2.2–2.7; and (c) hydrogen evolution in ferric sulphate solution of from 1.9 to 3.6 ml. per gram sample and maintaining the single-phase liquid in a molten and super-saturated condition, whilst crystallizing metallic titanium therefrom, by the simultaneous addition thereto of lower chloride of titanium and alkalinous metal at the rate at which titanium crystallizes therefrom, said process being further characterized in that the solution is an electrolyte in an electrolytic cell having a titanium anode and a metallic cathode, and in which direct current is passed through said electrolyte from anode to cathode at a rate sufficient to maintain said soluble titanium content by anodic action and said capacity to evolve hydrogen in ferric sulphate solution by cathodic action.

3. In a process of producing metallic titanium crystals from a single-phase liquid comprising a solution of soluble titanium as chloride in at least one molten alkalinous metal chloride, said liquid when solidified having a capacity to evolve hydrogen in ferric sulphate solution, the production of titanium crystals having an average diameter of more than 1 millimeter by maintaining said single-phase liquid in a composition range having a relationship of (a) total soluble titanium, (b) average titanium valence determined by reduction of ferric sulphate solution and (c) capacity to evolve hydrogen in ferric sulphate solution of: (a) 4.2–6.0% total soluble titanium; (b) an average valence of 2.2–2.7; and (c) hydrogen evolution in ferric sulphate solution of from 1.9 to 3.6 ml. per gram sample and maintaining the single-phase liquid in a molten and super-saturated condition, whilst crystallizing metallic titanium therefrom by the addition thereto, at the rate at which titanium crystallizes, of a reaction mixture containing lower chloride of titanium and alkalinous metal, said reaction mixture being produced by reacting at about 450° C. alkalinous metal and titanium tetrachloride in stoichiometric proportion.

References Cited in the file of this patent

UNITED STATES PATENTS

| | | |
|---|---|---|
| 2,734,856 | Schultz et al. | Feb. 14, 1956 |
| 2,741,588 | Alpert et al. | Apr. 10, 1956 |
| 2,817,631 | Gullett | Dec. 24, 1957 |

OTHER REFERENCES

Creamer et al.: "Electrodeposition of Titanium and Zirconium," WADC, 54–317 (U.S.B.M.), pp. 12 and 13.